US007341519B2

(12) United States Patent
McMain et al.

(10) Patent No.: US 7,341,519 B2
(45) Date of Patent: Mar. 11, 2008

(54) EMBEDDED CASINO GAME

(75) Inventors: Michael P. McMain, Cumming, GA (US); Michael J. Staw, Atlanta, GA (US); Josh Berman, Atlanta, GA (US)

(73) Assignee: Real Time Gaming, Inc., Atlanta, GA (US)

( * ) Notice: Subject to any disclaimer, the term of this patent is extended or adjusted under 35 U.S.C. 154(b) by 142 days.

(21) Appl. No.: 11/192,314

(22) Filed: Jul. 29, 2005

(65) Prior Publication Data

US 2007/0024002 A1 Feb. 1, 2007

(51) Int. Cl.
*A63F 13/00* (2006.01)

(52) U.S. Cl. ............................ 463/25; 463/31; 463/40; 463/46; 273/309; 273/274

(58) Field of Classification Search .................. 463/12, 463/13, 16–20, 25–28, 31, 40, 41, 46; 273/138.2, 273/138.1, 309, 274, 292, 143 R
See application file for complete search history.

(56) References Cited

U.S. PATENT DOCUMENTS 5,839,960 A * 11/1998 Parra et al. .................. 463/41
2002/0077170 A1* 6/2002 Johnson et al. ............... 463/16

OTHER PUBLICATIONS

TCS JI John Huxley brochure, E-FX Displays, p. 17, picked up at 2003 Gobal Gaming Expo.*

* cited by examiner

*Primary Examiner*—Benjamin H Layno
(74) *Attorney, Agent, or Firm*—Richard E. Kurtz; Greenberg Traurig, LLP

(57) ABSTRACT

A system and method are provided wherein a player of a casino game or an online casino game is provided one or more additional opportunities to place bets, or to consume information or content, or perform a variety of tasks, without the need to leave the casino game (or online casino game), and with minimal disruption of the casino game, thus potentially increasing the revenue to the casino.

14 Claims, 8 Drawing Sheets

EMBEDDED CASINO GAME

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

Various embodiments of the present invention relate to casino gaming and online casino gaming. In one example (which example is intended to be illustrative and not restrictive), the systems and methods of the present invention may be applied providing an interactive information and gaming display at a casino gaming table. In one example (which example is intended to be illustrative and not restrictive), the systems and methods of the present invention may be applied providing an interactive information and gaming display at an online casino gaming table.

BACKGROUND OF THE INVENTION

Gambling is a popular pastime. In many areas where gambling is legal, casinos provide a forum for individuals to gamble. In the casino there usually are specialized types of casino tables that are used to present gambling and game-playing opportunities to players. One genre of casino game is called a table game. In a table game, one or more players usually sit around a table where the game is played. In some table games, such as blackjack, one or more participants play against the house (i.e., the casino). The odds in such games favor the house. In still other types of table games such as roulette, the player plays against a fixed set of odds, but the game is moderated by the house. Here too, the odds favor the house. In other table games, such as poker, the house is paid to acts as a moderator.

Many casino table games are turn-based games, where multiple players of the same game take turns wagering money, chips, or another instruments. Tables are useful to encourage play and/or gambling activity. Because of the turn-based nature of these games, and the rate of play, there are several times in every game and between games when individual players are idle; that is, they have no action that the table game requires of them.

In recent years, online casinos have become very popular. Online casinos have generally attempted to mimic the look and feel of land-based casinos. Like their physical counterparts, online casinos have table games where there are times in every game and between games that individual players are idle.

In one effort to reduce the idle time of individual players, one land-based casino has embedded a video poker game for each potential player into the table surface of a Caribbean Stud poker table. While this permits players to play video poker while also playing Caribbean Stud poker, it presents a disadvantage because it may distract the individual player when it is time for her to take her turn in the table game. In addition, it could be distracting or disturbing to the other table game players.

SUMMARY OF THE INVENTION

Various embodiments of the present invention relate to casino gaming and online casino gaming.

In one example (which example is intended to be illustrative and not restrictive), the systems and methods of the present invention may be applied by providing a display at a casino gaming table that provides point-of-display attractions or promotions to encourage play by a gaming table occupant, thus potentially generating increased revenue for the casino.

In one example (which example is intended to be illustrative and not restrictive), the systems and methods of the present invention may be applied by providing an interactive information and gaming display at a casino gaming table that provides a gaming table occupant or player an interactive experience for additional gaming, information retrieval and/or other activities.

In one example (which example is intended to be illustrative and not restrictive), the systems and methods of the present invention may be applied by providing an interactive information and gaming display at an online casino gaming table to provide an online casino player an interactive experience for additional gaming, information retrieval and/or other activities.

In one example, (which example is intended to be illustrative and not restrictive), embedded casino table information units include a set of display and input devices embedded into each player spot of a casino game table, such as a poker or blackjack table. These information units are for the use of the players of the games at those tables, but are generally separate in all other ways from the game or games normally played on the table (except, for example, for secondary bets relating to the table game, or the potential to provide rewards as a result of, or tracking of the casino game). These devices may be used for information retrieval and display, traditional commerce, entertainment, or gambling.

In one example (which example is intended to be illustrative and not restrictive), a player of a casino game or an online casino game is provided an opportunity to place additional bets, consume information or content, or perform a variety of tasks, without the need to leave the casino game (or online casino game), and with minimal disruption of the casino game, thus potentially increasing the revenue to the casino for its players.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of at least one embodiment of the invention.

In the drawings.

DETAILED DESCRIPTION OF EMBODIMENTS OF THE INVENTION

Reference will now be made in detail to illustrative embodiments of the present invention, examples of which are shown in the accompanying drawings.

Figure 1:
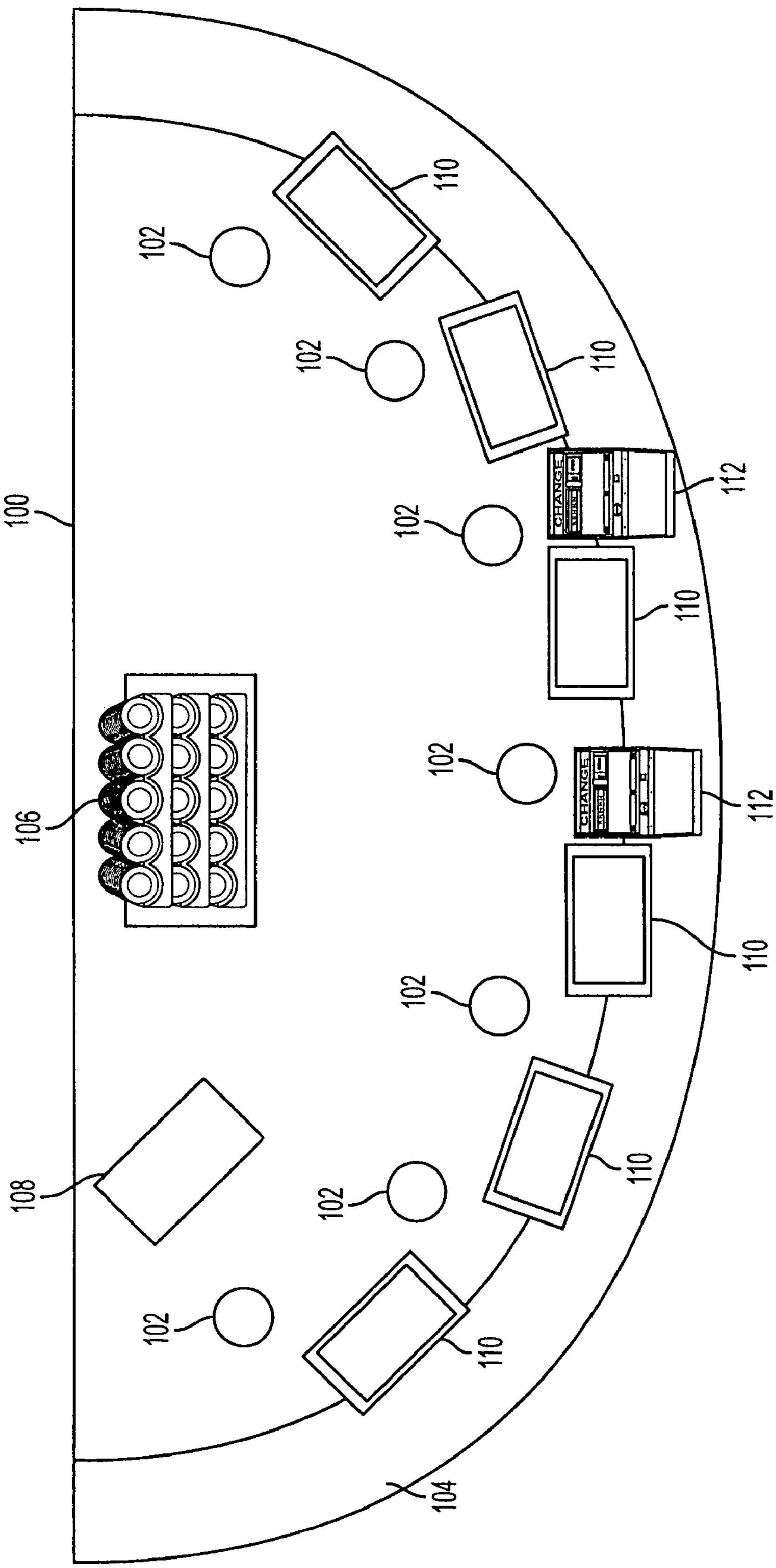
FIG. 1 is an illustration of a gaming table in accordance with am embodiment of the present invention.

Referring to FIG. 1, a blackjack gaming table 100 in accordance with one embodiment of the present invention includes betting areas 102, leaning rail 104, chip rack 106, card shoe 108, commerce displays 110, and bill acceptor 112. In one embodiment, the present invention is an embedded casino table unit which provides opportunities for information retrieval, entertainment, commerce and/or gambling to players at a casino table 100. In one embodiment, commerce display 110 is a touch screen display. In another embodiment (not shown), an auxiliary input device such as a keyboard, a mouse, a trackball, a track pad, or other pointing device, or even voice input or a camera input can be employed. In one embodiment, the input device is constructed so as to minimize interference with the normal operation of the table game 100.

Commerce display 110 may be a flat-screen display such as an LCD display, a TFT display or a plasma display, or it may be a CRT-type display. Commerce display 110 may include an audio output device such as speakers to permit the content displayed thereon to have an audio component. In one embodiment, the audio component is used for producing sound to draw the player's attention, or to provide feedback. In one embodiment, such as when playing music, the audio component may be the dominant entertainment capability of the commerce display 110. Commerce display 110 may be visible to one or more players at the table 100, and may be recessed, or comprise a filter or physical obstruction for privacy. Alternatively, commerce display 110 may consist of a heads-up display such as goggles or other personal projection system to further promote private viewing of the display 110. Similarly, commerce display 110 may comprise an audio output such as to a headset, or by sound projection, that promotes private listening to an audio component of display.

The commerce display 110 is operatively linked to a computer system (not shown) that provides its display and accepts its input. In one embodiment, the computer system is also operatively linked to devices that can provide output via printers, card writers or other output devices (not shown), such output may include receipts, tickets, stored value cards, or other types of print, magnetic or electronically stored information. In one embodiment, the computer system contains networking devices such as those that use wires, radio or cellular transmission. The networking devices can be used to network the computer system to CRM networks, gaming networks, private networks, or public networks in order to carry out the functionality of the commerce display 110 as described herein.

The commerce display 110 may be embedded in the game table 100, hingedly attached to the game table 100, or supported by the game table 100. In one embodiment, the commerce display 110 is located on a wall or other surface, or suspended from the ceiling, in each case, in a manner visible to a player.

Commerce display 110 may have an attract mode to encourage a player to use it. Alternatively, the commerce display 110 may visually look like the game table surface when it is not in use. A combination of these foregoing embodiments is also within the scope of the invention, providing a commerce display 110 that is generally felt-colored when not in use, but at predetermined or random times provides an attract mode display.

In one embodiment, the game table has a game play tracker (not shown) that provides data regarding the turn at the table 100. Whether being used by a player or not, the commerce display 110 may provide an indication of the player whose turn is pending.

When a player engages the commerce display 110, the player may be presented with a game to play that is not related to the game being played at the table 100. The game could be the same kind of game, in this example, blackjack, or another game such as poker, slots or any other game. In one embodiment some or all of the commerce displays 110 are associated with means for arranging payment such as bill acceptor 112. Many means for arranging payment are well known in the art, such as a coin or token (or chip) acceptor, a bill acceptor, a card acceptor (e.g., for debit, credit or stored value cards), a printed receipt acceptor (e.g, for bar-coded credit slips), or a stored value or credit account such as a usercode-based account related to the player, or an account that is identified by, e.g., an RFID token. Whether or not a commerce display 110 is associated with means for arranging payment, in one embodiment, payment may be arranged with the casino staff while the player is at the gaming table 100, or at a casino window or desk. In one embodiment, an account can be created and/or funded over the Internet in advance of, or during the player's visit to the casino. After payment is arranged, if required, the player may begin using the commerce display 110. In one embodiment, no payment is required for at least some features of the commerce display 110.

Figure 2:
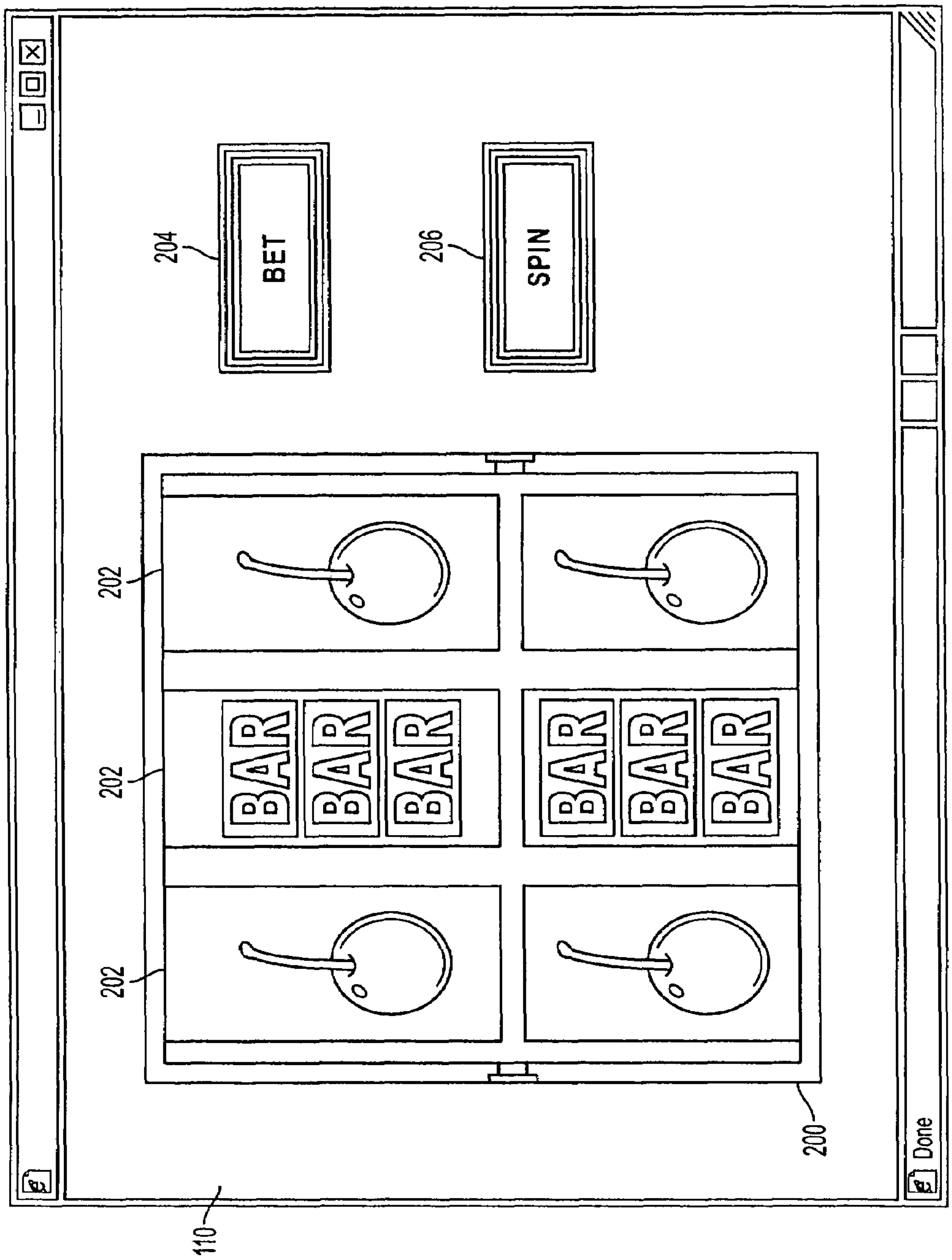
FIG. 2 is an illustration of a commerce display providing a video slot game according to an embodiment of the present invention.
Figure 3:
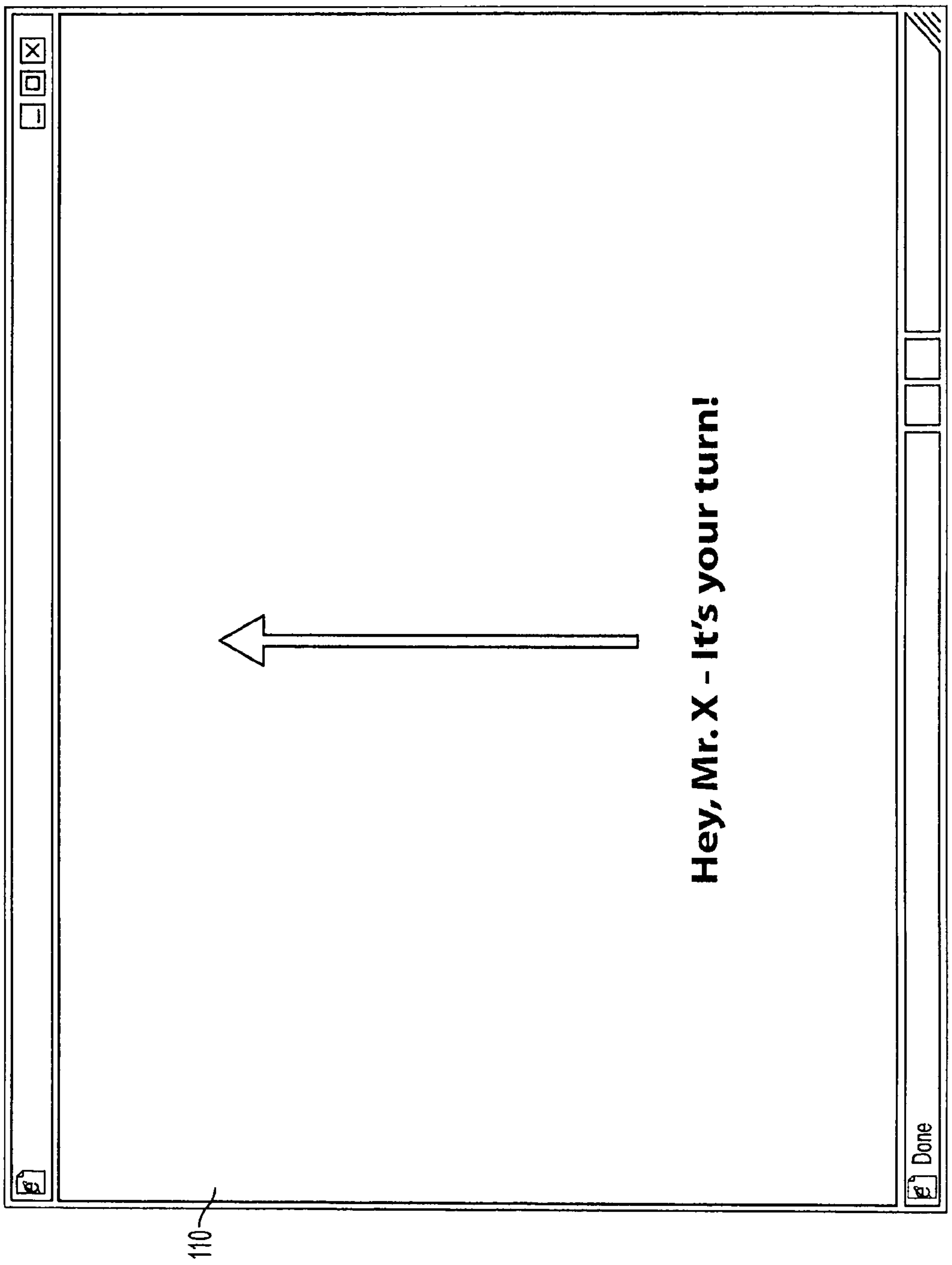
FIG. 3 is an illustration of a commerce display indicating that a player's turn is pending according to an embodiment of the present invention.

Turning now to FIG. 2, commerce display 110 displays a video slot machine 200 in accordance with one embodiment of the present invention. Video slot machine 200 includes virtual wheels 202, a bet selector 204 and a spin selector 206. Generally, use of video slot machine 200 is well known in the art. In one embodiment, the odds of the video slot machine 200 are affected by the player's duration at the gaming table 100. In one embodiment, however, the video slot machine 200 will not permit interaction from the player during the player's turn at the table game being played at the table 100. In one embodiment, commerce display 110 does not display video slot machine 200 when the user/player's turn is pending, but rather, displays a notice to the player indicating that her turn is pending, see FIG. 3. In one embodiment, commerce display 110 freezes the image display when its user's turn is pending. In one embodiment, the input device associated with commerce display 110 will not accept input when the display's user's turn is pending.

Figure 4:
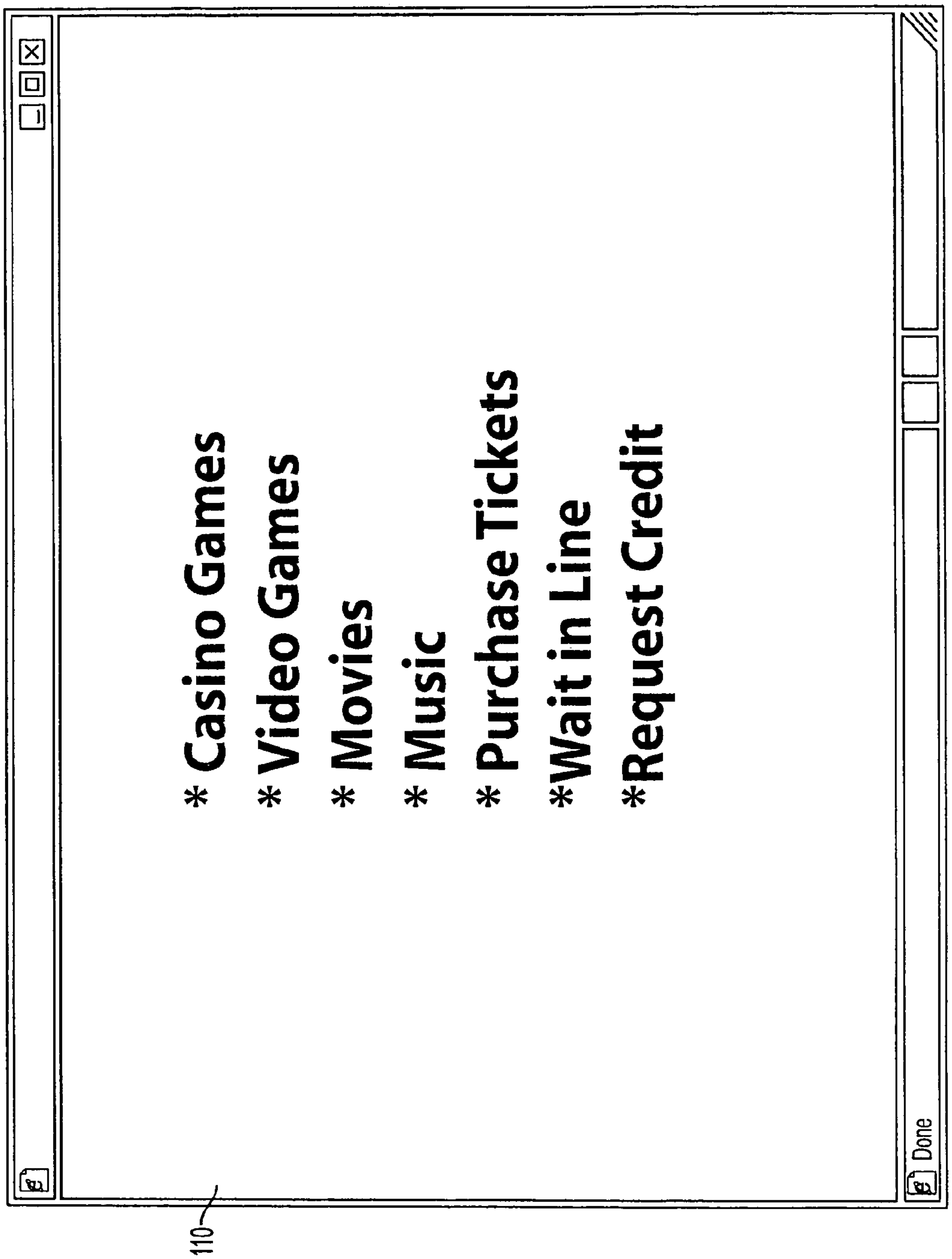
FIG. 4 is an illustration of a commerce display displaying a variety of menu choices in accordance with an embodiment of the present invention.

Turning now to FIG. 4, commerce display 110 displays a menu of choices including: casino games, video games, movies, music, tickets, wait in line and request credit. The list of menu choices is exemplary, and is intended to illustrate (but not to limit) a variety of features of the invention. The player using the commerce display 110 may navigate the menu to, for example, select one of a variety of casino games or video games, or may select to play a video game, watch a movie or listen to music. When a movie is being displayed on the commerce display 110, in one embodiment, commerce display 110 automatically pauses the movie when its user's turn is pending. When a video game is being played on the commerce display 110, in one embodiment, commerce display 110 automatically suspends the video game when its user's turn is pending. In one embodiment, menu choices could include casino games for fun (i.e., not for money), games like solitaire, or watching television or news clips, or even browsing the Internet, checking email, providing Internet chat or shopping. Providing these services may keep a player sitting at a table longer, thus increasing the value of that player to the casino.

In one embodiment, the commerce display 110 allows the player/user to play another game like slots, keno, or bingo. Some games that will work well when used in connection with the commerce display 110 (although this is illustrative, and is not intended to limit the scope of the invention) are "fire and forget" games—that is, games where the player just places a wager, and starts the game, but is not required to interact in order to win. These are particularly useful where the user is presented with a "fun" display while they await the outcome. Fire and forget games can keep the player in a lock-step, where the end of one game is in the middle of the other, thus there is never an easy moment to leave the table. The invention is also suited to slow-style betting such as sports, market or race betting. The odds can even be adjusted based upon the amount of play or losses at the gaming table 100. Moreover, the invention is particularly well suited to provide secondary games based upon the play at the gaming table 100, such as progressives, parlays and mortgage bets can be provided. For example, the user/player can make a bet on the commerce display 110 relating to the game on the gaming table 100—such as, a bet that the player/user will win three hands in a row. Moreover, the commerce display 110 can be used (for a fee or for free) to keep track of the game taking place at the gaming table 100—permitting the user to, e.g., take notes, look at strategy guides, or automatically track the play on the gaming table 100.

Commerce display 110 may also allow a user to purchase tickets to a show or other event. In one embodiment, such a transaction may be similar to the same type of transaction performed on a traditional computer over the Internet. The commerce display 110, however, may make promotions available to the player such as offering discount tickets or merchandise or offering special or reserved seating at a later time, thus encouraging the player to continue playing at the game table 100. Commerce display 110 may, for example, allow a user to order beverages to be delivered to the gaming table 100, thus allowing the player to remain at the table and reducing the potential distraction from looking for wait-staff to take an order. Payment for the beverages, if any is required, may be settled via the payment means of the commerce display 110, without the need to provide cash or tokens to the wait staff delivering the beverages. Commerce display 110 may, for example, allow a user to select "request credit" to get the pit boss' attention to the gaming table 100, thus allowing the player to remain at the table and reducing the potential distraction from looking for the pit boss.

In one embodiment, the present invention also provides a "get in line" feature. This feature can be used to obtain a place in line at, for example, another gaming table, or at a restaurant or general admission show. In one embodiment, commerce display 110 would keep the user/player informed of the amount of time remaining on the "line." Providing a "get in line" feature allows players to continue to play at the table 100 instead of physically waiting on a line, thus increasing the value of the player to the casino. In one embodiment, when the user/player nears the front of the line, the output device associated with commerce display 110 would provide an output that would permit the user access to, for example, the game table or restaurant for which the user electronically waited on line. In one embodiment, a commerce display at a game table that was the target of the user/player's reservation may display "Reserved for [PLAYER]" to prevent others from taking the seat until the user/player arrives. The computer system associated with the user/player's commerce display 110 interact with a computer system associated with one or more commerce displays at the game table that is the target of the reservation to coordinate this effort.

In one embodiment, the present invention also provides the ability for the casino to allow a user/player to select a type of game (or other entertainment) on the commerce display 110 that she'd rather be doing, (e.g., a lower minimum table for the same game, or a different game or form of entertainment), and the commerce display 110 can present choices to the user or make a series of conditional reservations for the user. Moreover, the casino can maintain kiosks that will allow a user not playing at a gaming table to find an open seat at an acceptable table. This can be especially helpful in large crowded casinos.

In one embodiment, the present invention also provides the ability for a user/player to check the user/player's casino-provided or casino-specific information on the commerce display 110. For example, the user/player may be able to check game rules, credit or comp balances, playthrough, or elite-club status. This can help to keep customer service personnel such as pit bosses and hosts free for other activities. Moreover, the commerce display 110 can be used to determine promotions that the user/player may be entitled to in consideration of the comp balance—or in consideration of a higher comp balance. In addition, the commerce display 110 may act as an information retrieval application such as one that allows a user/player to retrieve information about themselves, the game, casino, location, news, weather, sports, or other information that may be of value to the player. In one embodiment, the commerce display 110 acts as an information retrieval application to provide to the user/player information, the pursuit of which might have otherwise caused them to leave the table.

In one embodiment, the present invention also provides the ability for the casino to provide the user/player with specific promotions. In one embodiment, a commerce display can provide promotions in its attract mode to get players, for example, to play at higher minimum tables.

Figure 5:
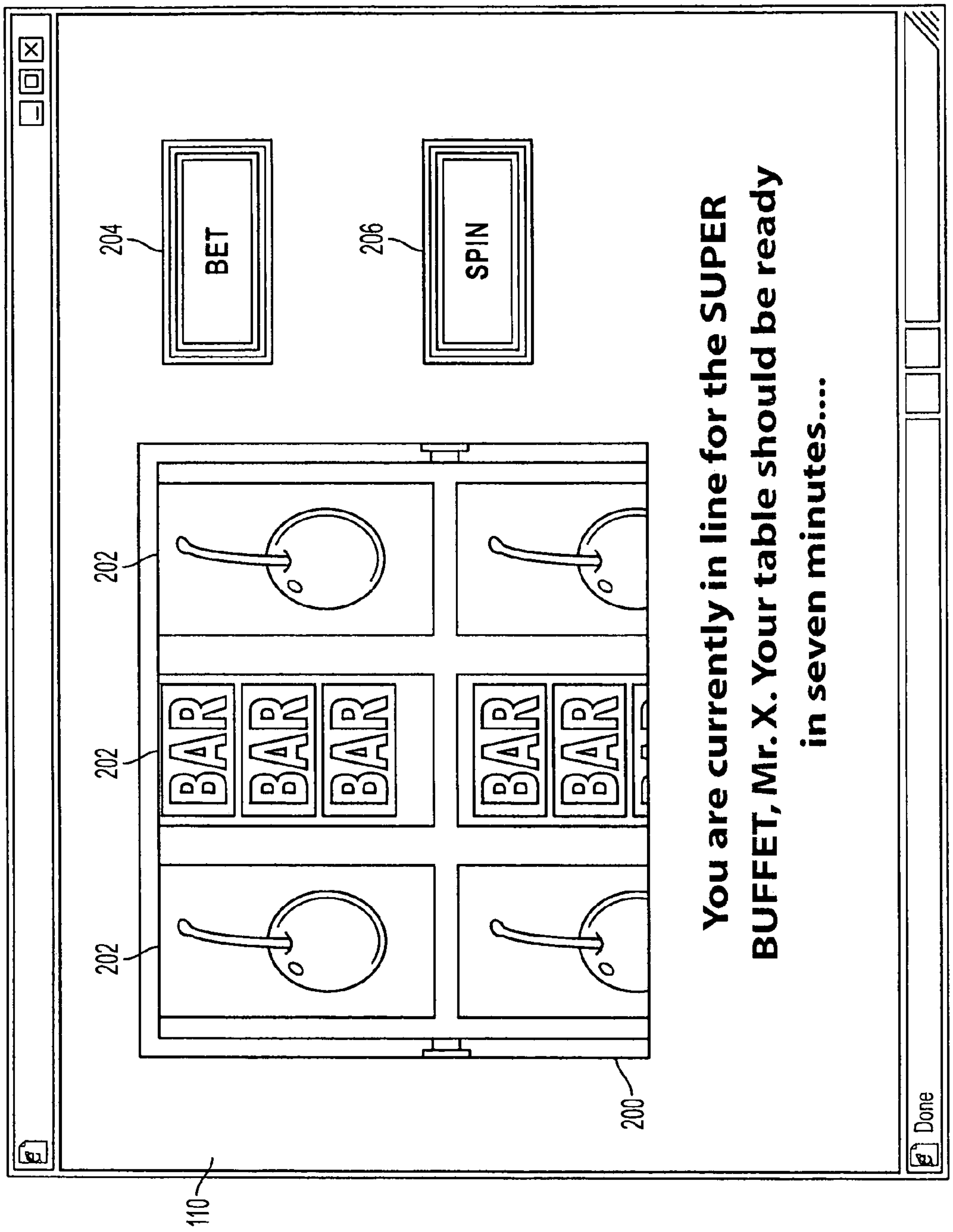
FIG. 5 is an illustration of a commerce display displaying an indication of the player's status in a line in accordance with an embodiment of the present invention.

In sum, according to one embodiment of the invention, the user/player of the commerce display 110 can take care of anything they would at another desk in the casino. This means that they can buy tickets for shows, 'stand in line' for the restaurant (and find out when their table is ready), order souvenirs, request change, request credit, request a pit boss, etc. This keeps them from standing in line, where they wouldn't make any more for the casino. In one embodiment of the invention, as illustrated in FIG. 5, commerce display 110 indicates to the user/player her place in line.

A casino can elect to charge for the use of the commerce display 110, or for access to selected choices from or content provided by the commerce display 110. In one embodiment, no separate charge (except the wager) is assessed for use of the commerce display 110 to play casino games for money. In one embodiment, no charge is levied for the use of the commerce display 110 to browse or purchase merchandise and/or souvenirs.

In one embodiment, the commerce display 110 has a closable and lockable cover to minimize opportunities for damage and manipulation. In one embodiment, the commerce display 110 is designed to be stored in a manner that minimizes opportunity for damage and manipulation, such as, for example, being designed to fold down and lock into the casino table.

Figure 6:
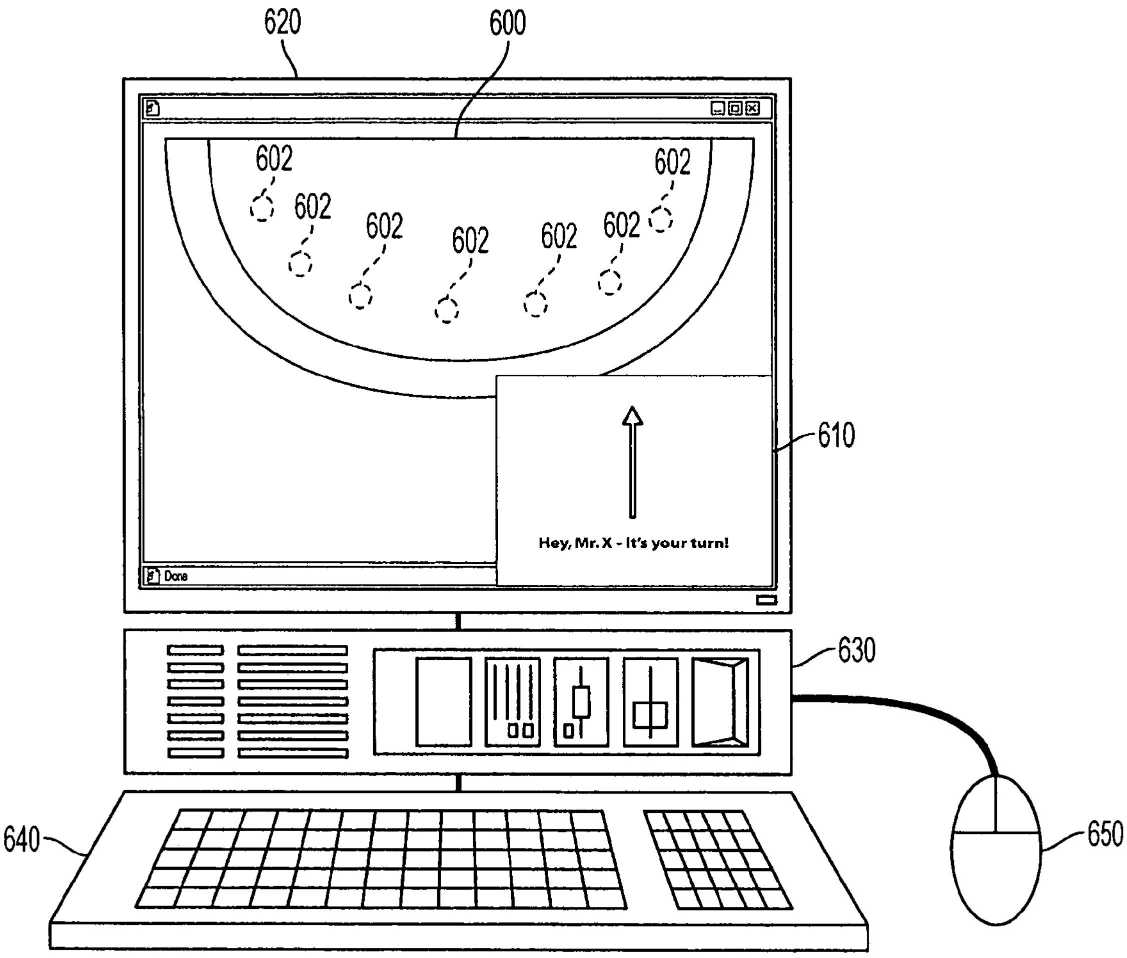
FIG. 6 is an illustration of a computer system comprising an online gaming table and a commerce display in accordance with one embodiment of the present invention.

Turning now to FIG. 6, a computer display 620 is shown displaying an online gaming table 600 including betting areas 602 and commerce display 610 in accordance with an embodiment of the present invention. The selection of blackjack for the online gaming table is for illustrative purposes only, and not intended to limit the invention in any way. The online gaming table 600 is a graphical image representing a blackjack gaming table 100. The commerce display 610 is also a graphical image, of a commerce display 110 as described above. Computer display 620 is operatively connected to an information display device, such as a personal, laptop, or palmtop computer 630 which is connected to the Internet. The computer 630 may be connected to the Internet via a wired or wireless link (e.g., RF, 802.11x, IR, Bluetooth, etc.) In one embodiment, computer 630 comprises a keyboard 640 and a mouse 650. The online gaming table 600 and the commerce display 610 may, but need not, share the same input modalities—in other words, for example, they may share the same keyboard 640 and the same mouse 650.

In one embodiment, both online gaming table 600 and commerce display 610 share a common output modality, that is, they are presented on a single computer display 620. Where the online gaming table 600 and commerce display 610 share a common output modality, the commerce display 610 may be visually displayed upon the online gaming table 600, as it may appear in a land-based casino, or it may be presented in a separate area, or in a separate window. In one embodiment, the commerce display is a small screen area on the display 620 where a player can play bingo, a slot machine, keno or some other game. In one embodiment, the commerce display 620 is a small floating screen area (i.e., a window) that may overlap, and/or obscure part of the online gaming table 600 when it is in use.

In one embodiment, the commerce display 610 is not operational during the player/user's turn in the online gaming table 600, or at other times the player/user's attention is required in the online gaming table 600. In one embodiment, the commerce display 610 may be made less attractive than the online gaming table 600 when it is time for the player/user's turn in the online gaming table 600. By way of illustration, but without intending to limit the ways in which the commerce display 610 may be made less attractive, it can be made non-operational by: preventing the commerce display 610 from receiving input from the user; suspending (e.g., freezing) the commerce display 610 to prevent its display from changing; blanking out the commerce display 610; replacing the commerce display 610 with an indication that it is the player/user's turn; or removing the commerce display 610 from the visual field of the player/user (e.g., from the computer display 620). In one embodiment, the relative brightness levels between the online gaming table 600 and the commerce display 610 are used to attract the player/user back to the online gaming table 600. In one embodiment, the relative sizes between the online gaming table 600 and the commerce display 610 are used to attract the player/user back to the online gaming table 600. In one embodiment, flashing the online gaming table 600 and the commerce display 610 is used to attract the player/user back to the online gaming table 600. In one embodiment, color is removed from the commerce display 100 to attract the player/user back to the online gaming table 600. In one embodiment, audio cues (e.g., voice, music or sounds) are used to direct or attract the player/user back to the online gaming table 600. Combinations of the above or other means for directing or attracting the player/user's attention may be used. In one embodiment, the online gaming table 600 and the commerce display 610 share the player/user's time and attention.

In one embodiment, to carry out the attention-sharing feature, the process operating online gaming table 600 can cause a non-operational state for the commerce display 610, (or other applications on the computer system 630) while a player/user's turn is pending. In one embodiment, an instance of Internet Explorer or other browser is the commerce display 610, whereby the player/user can, e.g., browse the Internet while the player/user's turn is not pending; when the player/user's turn is pending, the process operating online gaming table 600 causes online gaming table 600 to become the foreground window, and inhibits other windows from receiving input until the player/user's turn is complete, or until the game ends.

Figure 7:
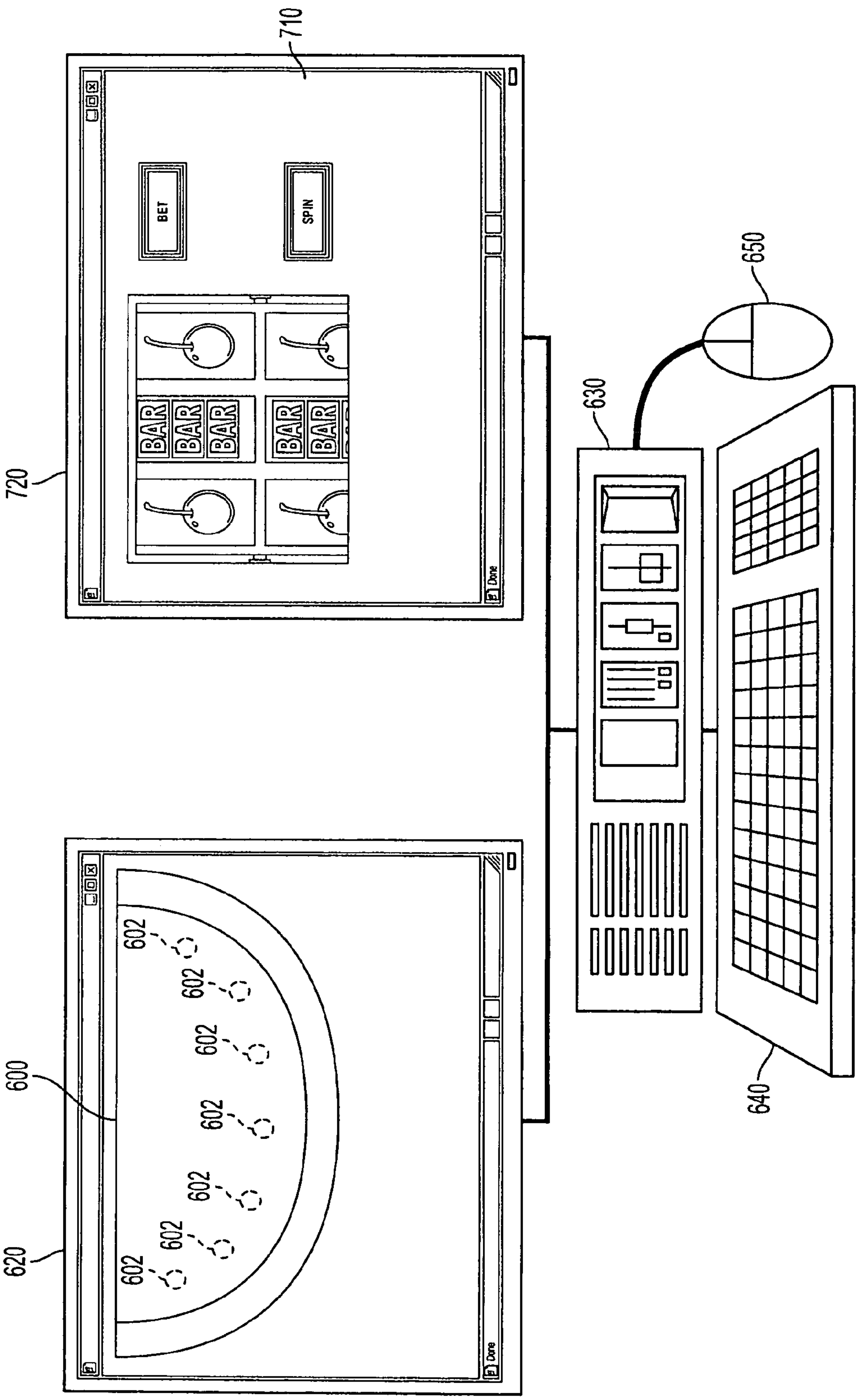
FIG. 7 is an illustration of a two-display computer system comprising an online gaming table and a commerce display in accordance with one embodiment of the present invention.

Turning to FIG. 7, a computer system 630 is shown operating two displays 620, 720. Display 620 presents online gaming table 600, while display 720 displays commerce display 710. In one embodiment, computer 630 comprises a keyboard 640 and a mouse 650.

As described in connection with FIG. 6, the commerce display 710 and the online gaming table 600 share the player/user's attention. In one embodiment, the commerce display 710 is inoperative or inactive when the player/user's attention is required in the online gaming table 600. In one embodiment, the commerce display 710 is made less attractive than the online gaming table 600, or the online gaming table 600 is made more attractive than the commerce display 710, when it is time for the player/user's attention to turn to the online gaming table 600.

Figure 8:
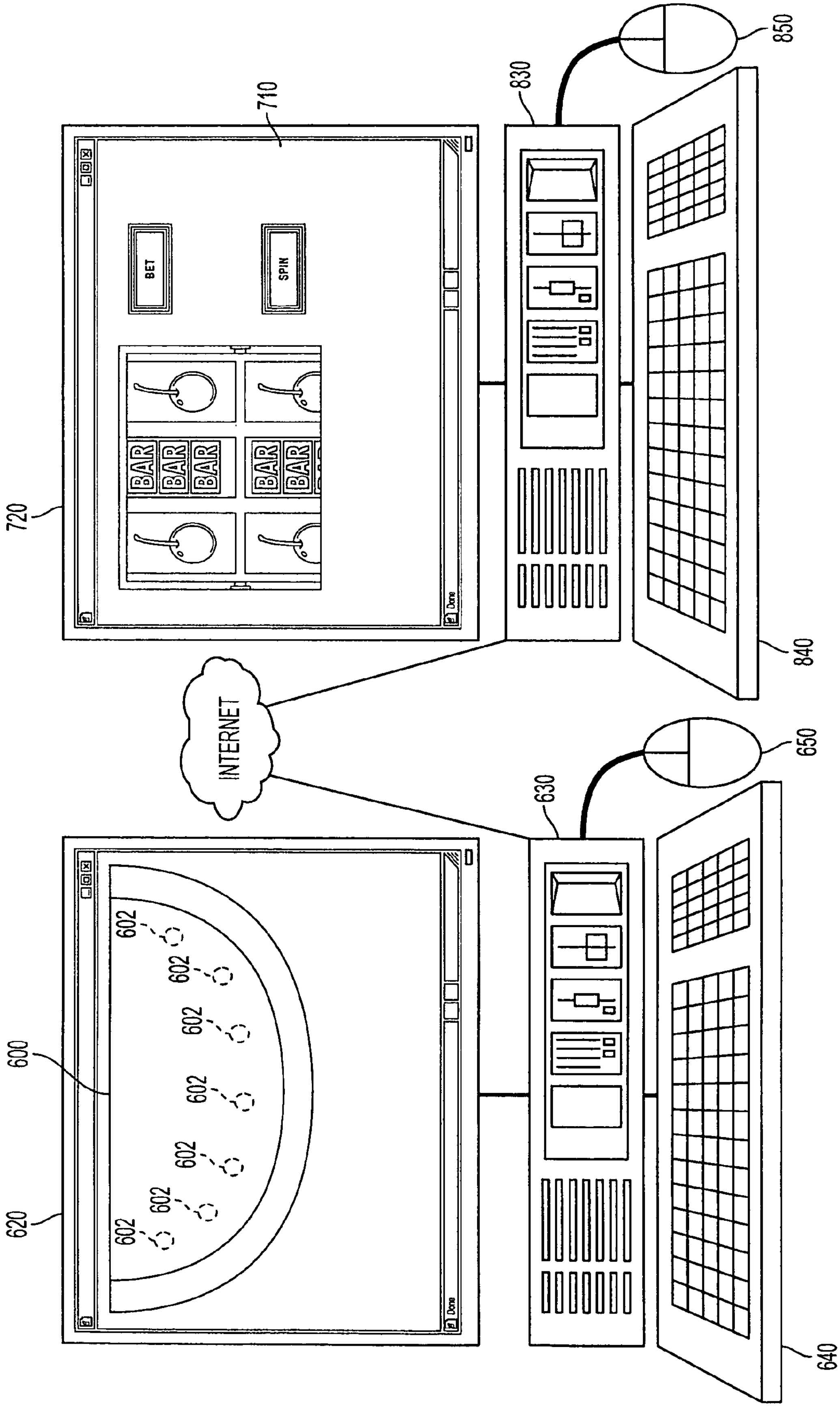
FIG. 8 is an illustration of a system of two computers comprising an online gaming table and a commerce display in accordance with one embodiment of the present invention.

Turning to FIG. 8, a computer system 630 is shown operating display 620. Display 620 presents online gaming table 600 having betting areas 602. Computer system 630 is operatively connected to the Internet via a wired or wireless link, and comprises a keyboard 640 and a mouse 650. Also shown in FIG. 6 is a computer system 830 shown operating display 720. Display 720 displays commerce display 710, comprising virtual wheels 202, a bet selector 204 and a spin selector 206. Computer 830 comprises a keyboard 840 and a mouse 850. According to an embodiment shown in FIG. 6, online gaming table 600 and commerce display 610 are separate processes, running on separate computers 630, 830. Although separate, the processes operating online gaming table 600 and commerce display 710 cooperate regarding, at least, the attraction of the player/user to online gaming table 600 when the player/user's attention is desired there. In one embodiment, the commerce display 710 is inoperative or inactive when the player/user's attention is required in the online gaming table 600. In one embodiment, the commerce display 710 is made less attractive than the online gaming table 600, or the online gaming table 600 is made more attractive than the commerce display 710, when it is time for the player/user's attention to turn to the online gaming table 600.

It should be noted that the selection of specific games and functions are illustrative only, and are not intended to limit the invention. It is within the scope of this invention to present any casino game in the gaming table 100, and online gaming table 600, and any casino or other activity in the commerce displays 110, 610, 710. It should be further notice that while each of the illustrations above show a single commerce display, it is squarely within the scope of this invention to provide two or more commerce displays. Where a plurality of commerce displays are used, they may together share the user's attention in any manner while the user's attention is not required at the gaming table. In one example, (which example is intended to be illustrative and not restrictive), a first commerce display provides a video poker game, while a second commerce display provides a slot game. In one embodiment, the slot game would be suspended while the user's input was required at the video poker game, and both the slot game and the video poker game would be suspended when the user's attention was desired at the online gaming table. While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A casino game table, comprising:

a game table surface having betting areas for a plurality of players and an area for a casino operator to run a casino game;

at least one commerce display associated with the game table surface, the commerce display including a display screen oriented to be visible by at least one of the plurality of players and an input device, the commerce display providing an attract mode wherein a promotion is offered to a bystander in consideration for becoming a player of the casino game at the casino gaming table, wherein the bystander can accept the offer using the input device and the commerce display can be used by the bystander after accepting the offer and joining the casino game being played at the casino game table as a player to perform at least one action selected from the group: playing video blackjack, playing video poker, playing video roulette, playing bingo, playing keno, betting on sports, or betting on horse races;

a payment acceptor that accepts payment at least one form selected from the group containing: coins, bills, credit cards, debit cards, stored value cards, coded receipts, chips, or tokens;

a play tracker operatively interfaced to the commerce display to provide data regarding the player's turn in the casino game being played at the casino game table; and a commerce display override that affects the commerce display when the play tracker indicates that the player's turn is pending.

2. The casino game table in accordance with claim 1, wherein a person manually operates the play tracker to keep track of the pending turn at the casino game table.

3. The casino game table in accordance with claim 1, wherein the override affects the commerce display in at least one manner selected from the group consisting of:

dimming the commerce display screen;

blanking the commerce display screen;

overwriting the commerce display screen with a message indicating the player's turn is pending;

disabling the input device; or freezing the commerce display screen.

4. A casino game table, comprising:

a game table surface having betting areas for a plurality of players and an area for a casino operator to run a casino game;

at least one commerce display associated with the game table surface, the commerce display including a display screen oriented to be visible by at least one of the plurality of players and an input device;

the commerce display providing an attract mode wherein a promotion is offered to a bystander in consideration for becoming a player of the casino game at the casino gaming table, wherein the bystander can accept the offer using the input device and the commerce display can be used by the bystander after accepting the offer and joining the casino game being played at the casino game table as a player to perform at least one action selected from the group: listening to music, watching movies, watching television, ordering drinks, virtually getting in line, purchasing merchandise, obtaining weather, obtaining news, playing video games, obtaining other entertainment;

a play tracker operatively interfaced to the commerce display to provide data regarding the player's turn in the casino game being played at the casino game table; and a commerce display override that affects the commerce display when the play tracker indicates that the player's turn is pending.

5. The casino game table in accordance with claim 4, wherein a person manually operates the play tracker to keep track of the pending turn at the casino game table.

6. The casino game table in accordance with claim 4, wherein the override affects the commerce display in at least one manner selected from the group consisting of:

dimming the commerce display screen;

blanking the commerce display screen;

overwriting the commerce display screen with a message indicating the player's turn is pending;

disabling the input device; or freezing the commerce display screen.

7. A casino game table, comprising:

a game table for playing a casino game, the game table having a betting area for at least one bet;

a commerce display associated with the game table, the commerce display including a display screen, the commerce display providing the capability to perform at least one action selected from the group: listening to music, watching movies, watching television, ordering drinks, virtually getting in line, purchasing merchandise, obtaining weather, obtaining news, playing video games, and obtaining other entertainment, the commerce display further being oriented to be visible to a player making a bet in the betting area during the player's turn in a casino game being played at the game table;

the commerce display also associated with an input device;

a play tracker operatively interfaced to the commerce display to provide data regarding the player's turn in the casino game being played at the casino game table; and a commerce display override adapted to affect the commerce display when the play tracker indicates that the player's turn is pending.

8. The casino game table in accordance with claim 7, wherein the casino game table is an online casino game table.

9. The casino game table in accordance with claim 8, wherein the commerce display comprises a commerce display computer system, and wherein the play tracker is software operating on the commerce display computer system.

10. The casino game table in accordance with claim 9, wherein the override affects the commerce display in at least one manner selected from the group consisting of:

dimming the commerce display;

blanking the commerce display;

overwriting the commerce display with a message indicating the player's turn is pending;

disabling the input device from interacting with the commerce display with which it is associated;

bringing the casino table game to the foreground; or freezing the commerce display screen.

11. The casino game table in accordance with claim 9, wherein the commerce display runs in one window on the commerce display computer system and the casino game table runs in a separate window on the commerce display computer system.

12. The casino game table in accordance with claim 9, wherein the override affects the commerce display in at least one manner selected from the group consisting of:

dimming the commerce display;

blanking the commerce display;

overwriting the commerce display with a message indicating the player's turn is pending;

disabling the input device from interacting with the commerce display with which it is associated;

adjusting the relative brightness between the window containing the casino table game and the window containing the commerce display;

bringing the window containing the casino table game to the foreground; or freezing the commerce display screen.

13. The casino game table in accordance with claim 7, wherein the override affects the commerce display in at least one manner selected from the group consisting of:

dimming the commerce display;

blanking the commerce display;

overwriting the commerce display with a message indicating the player's turn is pending;

disabling the input device from interacting with the commerce display with which it is associated; or freezing the commerce display screen.

14. The casino game table in accordance with claim 13, wherein the casino game table is a physical casino game table.

* * * * *